May 30, 1950     W. K. CRESON     2,509,587
STEERING POST BEARING
Filed Sept. 14, 1945
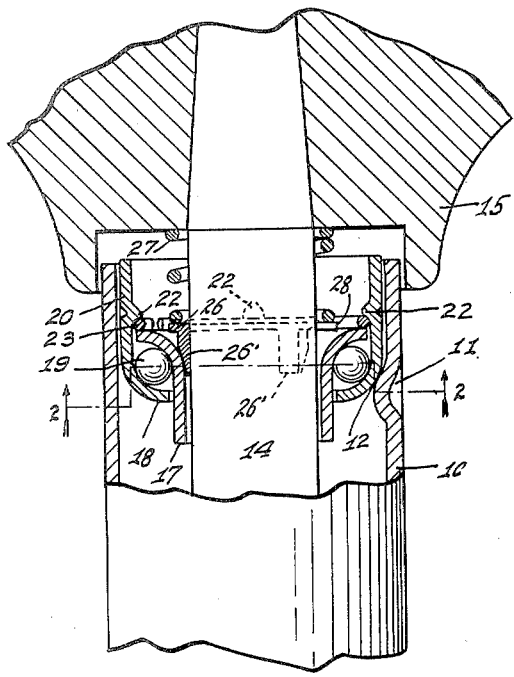
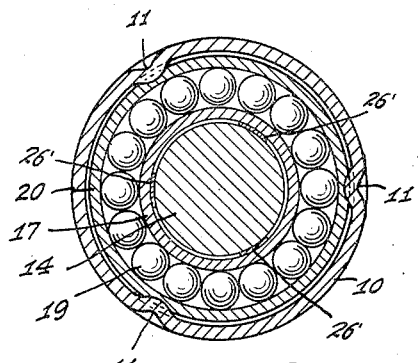
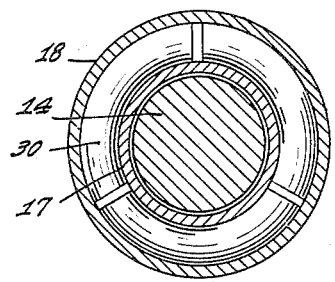
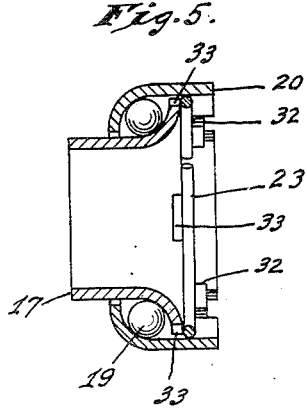
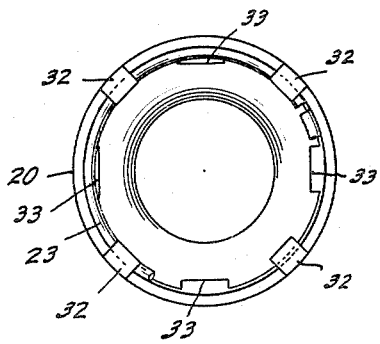
INVENTOR.
WILLIAM K. CRESON,
BY
ATTORNEYS Patented May 30, 1950

2,509,587

UNITED STATES PATENT OFFICE 2,509,587

STEERING POST BEARING

William K. Creson, La Fayette, Ind., assignor to Ross Gear & Tool Company, La Fayette, Ind., a corporation of Indiana Application September 14, 1945, Serial No. 616,250

6 Claims. (Cl. 308—197)

My invention relates to a bearing and bearing-mounting suitable for use in supporting the upper end of the steering shaft in the steering post of a vehicle. As normally manufactured, the steering gear of an automobile embodies a tubular steering post through which there extends a steering shaft bearing the steering wheel at its upper end. To free the steering shaft of radial loads, the steering post is usually relatively rigid in character, and the upper end of the steering shaft is rotatably supported from the upper end of the steering post. The bearing means employed between the steering shaft and the upper end of the steering post obviously should be of a type which, without imposing any stress on the steering shaft, will locate the upper end of the steering shaft transversely of the steering post without any undesirable lost motion.

It is the object of my invention to produce a steering-shaft bearing which will rotatably support the steering shaft in fixed position transversely of the steering post, which will perform its supporting function without imposing any stress on the steering shaft, and which can be simply and economically manufactured. A further object of my invention is to produce an improved bearing construction.

In carrying out my invention, I employ inner and outer bearing races formed with complementary flanges between which one or more bearing elements are received. The outer bearing race is loosely received within the steering column, which is provided with an annular series of inwardly projecting ribs having axially inclined faces against which the outer bearing race can be forced to locate it transversely of the steering column. Associated with the inner bearing race and closely surrounding the steering shaft is a ring held resiliently in contact with the inner bearing race by yielding means such as a compression spring surrounding the steering shaft. At least one of the interengaging faces of the inner race and its associated ring is conical in character, whereby the axial pressure of the ring against the inner race will tend to hold the latter concentric with the shaft. The arrangement of the parts is such that the pressure exerted by the ring on the inner race is transmitted through the bearing elements to the outer race and serves to hold the latter in engagement with the inclined ribs of the steering post.

The accompanying drawing illustrates my invention:

Fig. 1 is an axial section through the upper end of a steering column; Fig. 2 is a transverse section on the line 2—2 of Fig. 1; Fig. 3 is a section similar to Fig. 2 illustrating a preferred modification of the invention; Fig. 4 is an axial section of a further modification; and Fig. 5 is an end elevation of the bearing shown in Fig. 4.

The device illustrated in the drawing comprises a tubular steering column 10 provided adjacent to its upper end with an annular series of inwardly projecting ribs 11, preferably three in number, having inner faces 12 which are inclined inwardly and downwardly of the steering post. Conveniently, the ribs 11 are formed by indenting the wall of the steering post 10, as shown.

A steering shaft 14 passes axially through the steering post 10 and into the hub 15 of a steering wheel to which the shaft is rigidly secured. The upper end of the shaft 14 is supported from the steering post 10 through the medium of inner and outer bearing races 17 and 18, between which bearing elements 19 are disposed, such bearing elements being shown as balls in the form of the invention illustrated in Figs. 1 and 2. The ball-engaging surfaces of the races 17 and 18 are so shaped that tangents at their points of contact with the balls are inclined to the axis of the shaft 14 whereby the bearing is adapted to transmit both radial and axial loads.

The outer race 18 includes a cylindrical flange 20 the exterior diameter of which is somewhat smaller than the interior diameter of the steering post 10. The inner race 17 has an internal diameter somewhat greater than the diameter of the steering shaft 14. Beyond the inner race 17, the flange 20 of the outer race is provided with an annular series of inwardly projecting indentations 22 which co-operate with a collapsible split spring ring 23 to hold the races in assembled condition.

Associated with the inner bearing race 17 I provide a thrust member 26 which, in the form shown, comprises a flat sheet-metal collar provided with a series of angularly spaced centering fingers 26', preferably three in number. The fingers 26' are wedge-like in axial section, as will be evident from Fig. 1, being thicker at their points of juncture with the collar-body 26 than at their free ends. A compression spring 27 acting between the hub 15 and the collar forces the tapering fingers 26' into the annular space between the shaft 14 and the inner race 17, thus locating the inner race in co-axial position with reference to the shaft. In order that rigidity of the collar 26 may not interfere with the desired centering action of the fingers 26', the circumferential continuity of such collar is interrupted by a radial slot 28 which will permit deformation of the collar body to an extent necessary to insure that each centering finger 26' will bear against both the shaft 14 and the inner race 17.

The taper of the fingers 26' is great enough to prevent them from becoming self-locked between the shaft 14 and race 17, with the result that the axial pressure exerted on the collar 26 by the spring 27 is transmitted through the race 17 and bearing elements 19 to the outer race 18 and serves to hold the latter in contact with the inclined faces 12 of the ribs 11, thus locating the bearing assembly in definite position transversely of the steering post.

The construction described lends itself to economical manufacture, as the races 17 and 18 can be formed as sheet-material stampings. The ribs 11 act to center the outer race 18 irrespective of variations in the diameter of the outer race. Similarly, the ring 26 acts to center the inner race 17 with respect to the shaft 14 irrespective of variations in the inner diameter of the inner race. The ring 26 may be made to fit the shaft 14 snugly without the necessity for maintaining close manufacturing tolerances, by leaving the ends of the ring unjoined and by forming it so that its inner diameter will be slightly less than the diameter of the shaft 14.

In the modified form of the invention illustrated in Fig. 3, a segmental ring 30 of circular cross section is substituted for the balls 19 shown in Figs. 1 and 2. I have found that in some instances operation of the steering gear as a whole can be improved by slightly increasing the resistance offered to rotation of the steering shaft 14. If the ring 30 is made of some suitable bearing material, such as bronze or brass, the desired result will be achieved without undue wear; and any wear which does occur will be taken up as a result of the action of the spring.

In the modified bearing construction shown in Figs. 4 and 5, the retaining ring 23 is held in place by ears 32 turned inwardly from the periphery of the flange 20 on the outer race 18. If necessary to permit insertion of the inner race into the outer race, the former may be provided in its periphery with notches 33 which can be aligned with the ears 32 when assembly is effected.

I claim as my invention:

1. In a steering column, a tubular steering post, a steering shaft extending through said post and provided with a steering wheel, a bearing comprising inner and outer races surrounding said shaft, the outer diameter of said bearing being less than the inner diameter of said steering post, said steering post being provided with an annular series of inwardly projecting ribs having inner bearing-engaging faces inclined inwardly of the steering post and away from said steering wheel, and yielding means for urging said outer race axially into engagement with the inner faces of said ribs, such engagement between the outer race and the inclined inner faces of the ribs serving to locate the outer race both axially and longitudinally of said post.

2. The invention set forth in claim 1 with the addition that said bearing is capable of transmitting both radial and axial loads, said yielding means comprising a helical compression spring surrounding said shaft and acting between the inner bearing race and the steering wheel.

3. The invention set forth in claim 1 with the addition that said ribs are inwardly offset portions of the wall of the tubular steering post.

4. The invention set forth in claim 1 with the addition that the internal diameter of said inner race is greater than the diameter of the shaft, to provide an annular space between the race and shaft, a thrust collar surrounding said shaft, centering means on said thrust collar engaging said shaft and inner race to locate them coaxially, said yielding means comprising a spring acting on said collar to force said centering means into engagement with said inner race.

5. In a steering column, a tubular steering post, a steering shaft extending through said post and provided with a steering wheel, a bearing comprising inner and outer races surrounding said shaft, said inner race having an internal diameter greater than that of said shaft to provide an annular space between the shaft and race, a thrust collar surrounding the shaft and provided with angularly spaced, tapered fingers extending into said annular space, the intervals between said fingers being greater than the width of the fingers, and yielding means urging said collar axially to force each of said tapered fingers into engagement with said shaft and inner race.

6. In a steering column, a tubular steering post, a steering shaft extending through said post and provided with a steering wheel, a bearing comprising inner and outer races surrounding said shaft, and an annular series of circumferentially elongated bearing elements disposed between said inner and outer races for transmitting radial and axial loads therebetween.

WILLIAM K. CRESON.

REFERENCES CITED

The following references are of record in the file of this patent:

UNITED STATES PATENTS

| Number | Name | Date |
|---|---|---|
| 886,950 | Cornforth | May 5, 1908 |
| 1,643,977 | Buckwalter | Oct. 4, 1927 |
| 1,776,412 | Bresien | Sept. 23, 1930 |
| 1,895,499 | Stough | Jan. 31, 1933 |
| 1,998,735 | Rasmussen | Apr. 23, 1935 |
| 2,018,027 | Marks | Oct. 22, 1935 |
| 2,232,473 | Pulleyblank | Feb. 18, 1941 |